(12) United States Patent
Piolet et al.

(10) Patent No.: US 8,224,503 B2
(45) Date of Patent: Jul. 17, 2012

(54) METHOD OF INSPECTING THE INTEGRITY OF AN AVIONICS SYSTEM, AND AN INSPECTION DEVICE FOR IMPLEMENTING SAID METHOD

(75) Inventors: Philippe Piolet, Marseilles (FR); Serge Germanetti, Marseilles (FR); Erwan Guillanton, Aix en Provence (FR)

(73) Assignee: Eurocopter, Marignane Cedex (FR)

( * ) Notice: Subject to any disclaimer, the term of this patent is extended or adjusted under 35 U.S.C. 154(b) by 315 days.

(21) Appl. No.: 12/608,419

(22) Filed: Oct. 29, 2009

(65) Prior Publication Data

US 2010/0114409 A1 May 6, 2010

(30) Foreign Application Priority Data

Nov. 3, 2008 (FR) ...................................... 08 06109

(51) Int. Cl.
*G01C 23/00* (2006.01)
(52) U.S. Cl. ....... 701/3; 165/185; 165/104.33; 165/80.4
(58) Field of Classification Search ...... 701/3; 165/104, 165/185, 80.4
See application file for complete search history.

(56) References Cited

U.S. PATENT DOCUMENTS

| 5,111,402 | A | 5/1992 | Brooks et al. | |
|---|---|---|---|---|
| 6,915,189 | B2 * | 7/2005 | Igloi et al. | 701/14 |
| 7,778,744 | B2 * | 8/2010 | Rath et al. | 701/3 |
| 2007/0027589 | A1 * | 2/2007 | Brinkley et al. | 701/3 |
| 2007/0236366 | A1 * | 10/2007 | Gur et al. | 340/945 |

FOREIGN PATENT DOCUMENTS

FR   2899050   9/2007

OTHER PUBLICATIONS

French Search Report dated May 19, 2009 from corresponding FR0806109.

* cited by examiner

*Primary Examiner* — Thomas G. Black
*Assistant Examiner* — Luke Huynh
(74) *Attorney, Agent, or Firm* — Brooks Kushman P.C.

(57) ABSTRACT

A method of inspecting the integrity of an avionics system (1) installed in an aircraft, by inspecting the integrity in terms of electrical installation and data acquisition and transmission, wherein the method includes:

using an Ethernet network (4) connecting the avionics system (1) to an inspection computer (3);

using the computer (3) to generate first inspection signals transmitted to the component and/or to acquire second inspection signals coming from the component;

using data read and write elements of a controller of the avionics system (1) to generate reference data relating to the component and transmitted to the inspection computer (3) via the Ethernet network (4); and displaying the reference data and the inspection signals and where appropriate recording the reference data and the inspection signals.

16 Claims, 1 Drawing Sheet

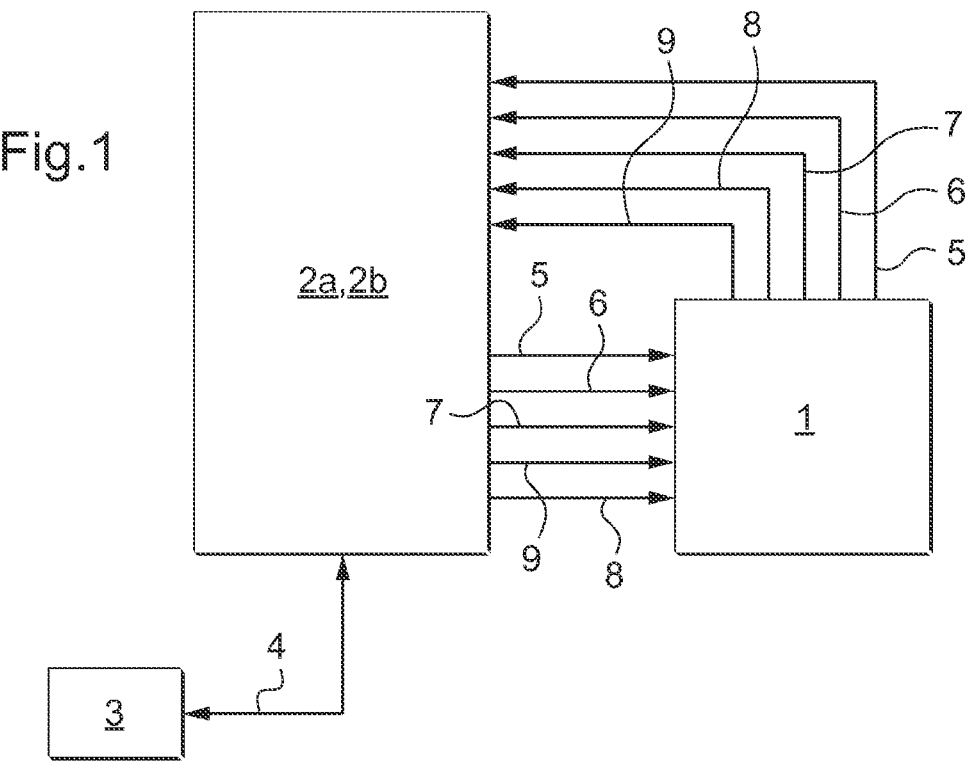
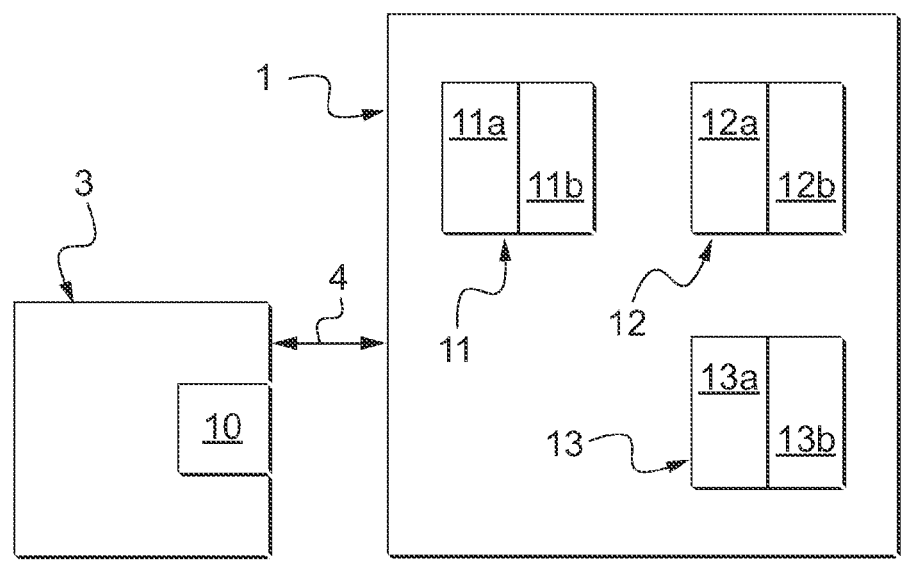

METHOD OF INSPECTING THE INTEGRITY OF AN AVIONICS SYSTEM, AND AN INSPECTION DEVICE FOR IMPLEMENTING SAID METHOD

FIELD OF THE INVENTION

The present invention relates to the general technical field of verifying and inspecting the integrity of on-board aviation systems and equipment.

More particularly, the present invention relates to inspecting the integrity of electrical installations of on-board avionics systems, and in particular electrical cabling.

BACKGROUND OF THE INVENTION

Avionics systems are known that, on delivery, are already loaded with their operating software. Such software is generally loaded into avionics systems in a laboratory or on test benches that stimulate the environment of such avionics systems.

Known solutions for verifying the integrity of an avionics system in terms of electrical installations and of data acquisition and transmission generally comprise several steps.

A first step consists in verifying the electrical cabling, e.g. by performing continuity and breakdown tests.

A second step consists in verifying the components or the pieces of equipment of the avionics system, e.g. during testing in a laboratory or on a test bench.

A third step then consists in inspecting the avionics system installed on board an aircraft, e.g. by means of tests of a functional nature. Such tests can be implemented, for example, by disconnecting certain connectors. Those solutions require operating software to be present on board.

Those known solutions nevertheless present a certain number of drawbacks.

The main drawback result from the number of different steps that those solutions implement, relying on the intervention of different teams of personnel and said steps having durations that are relatively long.

Another non-negligible drawback is associated with the risk of damage to the cabling and/or the equipment, mainly to connectors during the connection and disconnection operations used to perform tests.

In particular with new avionics systems, there is presently a desire to load the operating software into such systems after the systems have been installed in the aircraft.

In order to install software in an on-board avionics system, it is necessary to have an avionics system installed on board the aircraft and also for that system to present integrity in terms of its electrical cabling.

OBJECT AND SUMMARY OF THE INVENTION

The object of the present invention is thus to avoid the above-mentioned drawbacks and to inspect the integrity of an on-board avionics system in terms of electrical installations and in terms of data acquisition and transmission, prior to loading or installing software into the avionics system.

Consequently, the object of the present invention is to provide a novel method of inspecting the integrity, in particular in terms of electrical installations of an avionics system.

Another object of the present invention is to provide operators with a novel inspection device for implementing said method of inspecting the integrity of an avionics system.

The objects given to the invention are achieved with the help of a method of inspecting the integrity of at least one component of an avionics system installed in an aircraft, said method consisting in monitoring the integrity of said component in terms of electrical installation and data acquisition and data transmission, wherein the method consists in:

a) using an Ethernet network connecting the avionics system to an inspection computer to exchange inspection signals;

b) using the inspection computer to generate first inspection signals that are transmitted to the component and/or to acquire second inspection signals that come from the component;

c) using data read and write means of a controller of the avionics system to generate reference data relating to the component and transmitted to the inspection computer via the Ethernet network;

d) using a screen connected to the inspection computer to display the reference data and the inspection signals for the purposes of monitoring and/or comparison by an operator; and e) selecting the reference data and the inspection signals, and recording the selected reference data and the inspection signals in a memory of the inspection computer (3).

In an implementation, the method in accordance with the invention consists in inspecting all of the components of the avionics systems.

In an implementation, the method in accordance with the invention consists, on starting, in displaying the results of automatic test functions that are incorporated in the controller of the avionics system and that relate to each component of the avionics system. Such an improvement makes it possible to test the hardware of the equipment, thus avoiding searching for a breakdown in the cabling when in fact the breakdown is associated with an input or an output of one of the components of the system to which the test function is applied.

In an implementation, the method in accordance with the invention consists in selecting stimulation values as first inspection signals, and in injecting the stimulation values in real time to the outlet terminals of the outlet interface of each component.

In an implementation, the method in accordance with the invention consists in injecting the stimulation values individually one after another.

Thereafter, the method consists in using the controller of the avionics system to verify whether an appropriate reaction to these injected stimulation values is observed on the target equipment. A reaction is considered as being appropriate if it gives rise to the reference data.

In an implementation, the method in accordance with the invention consists in acting in real time to acquire second inspection signals constituted either by the operating states of all of the input terminals of the input interface of each component, or else the physical values measured at said input terminals.

The signals taken from the inputs are then compared with the reference data. In an implementation in accordance with the invention, the reference data is constituted, for example, by predefined electrical values, replacing data from the sensors and injected into the avionics system.

In another implementation of the method in accordance with the invention, the reference data is generated by an automatic test system, incorporated in the avionics system during production thereof.

In the context of the method in accordance with the invention, it is possible to envisage stressing a sensor that is delivering signals in order to define reference data. By way of example one such signal comprises measuring the voltage of a battery powering an apparatus or a component.

In an implementation in accordance with the invention, the method consists in acquiring inspection signals relating to the input terminals at a frequency of about 2 Hz.

In an implementation, the method in accordance with the invention consists in controlling functions of an aircraft under the control of the avionics system, said controlling functions comprising at least a function chosen in the following list: fuel management, engine management, buoyancy, or managing fire-fighting, managing the hydraulic system, managing the electrical system, etc.

In an implementation, the method in accordance with the invention consists in incorporating inspection instructions in the operating software of each equipment managed by the avionics system, said inspection instructions serving to generate and to acquire signals that are functionally compatible with the inspection computer.

In an implementation, the method in accordance with the invention consists in inhibiting the inspection instructions when the aircraft is in its operational functioning state, and in activating said inspection instructions when the aircraft is in the maintenance state.

The inspection system includes operating states and each operating state comprises one or more operating modes. By way of example, a state that is said to be "operational" includes in particular an initialization mode, a normal mode, and a degraded mode. A state that is said to be a "maintenance" state includes in particular a mode for testing the on-board system and a mode for loading or unloading data.

The objects given to the present invention are also achieved with the help of an inspection system for implementing the above-specified inspection method, wherein the system comprises:

- an inspection computer associated with a display screen or a user graphics interface;
- at least one software for generating in particular inspection signals and reference signals for inspection purposes;
- an Ethernet network connecting the inspection computer to the avionics system or to at least one component of the avionics system, in particular so as to exchange inspection signals and reference data;
- on-board inspection means including commonplace means for reading and writing signals and data of each component; and
- on-board transmission means for conveying signals or data via the Ethernet network between at least one component of the avionics system and the inspection computer.

In an embodiment, in accordance with the invention, the inspection system comprises means for selecting data and/or signals and for recording the selected data and/or signals.

In an embodiment of the inspection system in accordance with the invention, the commonplace means for reading and writing incorporated in each component of the avionics system include means for processing analog acquisition runs from the components of said avionics system and means for transforming said acquisitions into digital values, which values are made available in real time on a port of the Ethernet network. The means for transforming the acquisitions into digital values include one or more processors, in known manner.

By way of example, the commonplace means for reading and writing are constituted by equipment or components that are already provided for participation in the operational operation of the on-board avionics system.

In an embodiment of the inspection system in accordance with the invention, the inspection means and the transmission means are on board the aircraft.

The inspection system in accordance with the invention enables the elements constituting the avionics system in its operational operating state to be connected thereto as inputs and outputs, and it enables an Ethernet connection to be added so as to allow the external inspection computer to inject the first inspection signals for stimulating outputs or to transfer to the outside the second signals measured as inputs.

An advantage of the control system in accordance with the invention lies in its simplicity and in its ease of use.

The inspection method in accordance with the invention makes it possible to carry out inspection more quickly than do known methods, because it has only a single inspection step.

In addition, implementing the inspection method in accordance with the invention requires only one team of operators to be involved.

It should also be observed that the inspection method in accordance with the invention makes it possible to avoid disconnecting connectors in the avionics system, thereby eliminating any risk of damaging or wrongly re-assembling the electrical installation.

Insofar as the inspection method is implemented using an avionics system that is already installed on board the aircraft, without disconnecting its connectors, it is possible to inspect all of the signals received and transmitted by the avionics system, without omission.

Another advantage is obtained insofar as, once the avionics system has been installed on board the aircraft, there is no longer any need to perform any disassembly and re-assembly operation thereon in order to verify its integrity.

Another advantage of the invention lies in the fact that a laboratory or a measurement bench is not required for implementing the inspection method in accordance with the invention.

Another advantage of the invention lies in the possibility of testing components of the avionics system, such as sensors connected to the controller of the avionics system, even though they are not necessarily directly connected to the Ethernet network.

In the context of the invention, while developing prototype aircraft, e.g. helicopters, it is possible to test cabling even before the operational software has been developed. Similarly, if provisions have been cabled that are not used by the operational software of the avionics system, those provisions can be tested even though the operational software is not capable of so doing.

Another advantage of the invention is associated with the possibility of using the inspection instructions of the software in other applications, e.g. downloaded into the avionics system, e.g. for the purpose of automating certain test sequences.

BRIEF DESCRIPTION OF THE DRAWINGS

The invention and its advantages also appear in greater detail from the following description of embodiments given byway of illustration and with reference to the accompanying figures, in which:

FIG. 1 is a block diagram showing an embodiment of the inspection system in accordance with the invention; and FIG. 2 is another block diagram showing an embodiment of the inspection system in accordance with the invention.

Elements that are structurally and functionally identical and present in more than one of the figures are given the same references in each of them.

MORE DETAILED DESCRIPTION

FIG. 1 is a diagram of an embodiment of an inspection system in accordance with the invention, and illustrates the operation thereof.

The inspection system comprises an avionics system 1 or at least a component of said avionics system 1, installed in an aircraft.

The inspection system also comprises on-board inspection means 2a, themselves including commonplace means for reading and writing inspection signals and reference data relating to each component of the avionics system 1. The inspection system according to the invention thus makes use of the inspection means 2a incorporated in each component of the avionics system 1.

The inspection system in accordance with the invention also comprises on-board transmission means 2b for conveying signals or data between the avionics system 1 or one of its components, and an inspection computer 3. The transmission means 2b are likewise incorporated in each component of the avionics system 1.

The inspection system in accordance with the invention can also comprise means for selecting and recording the data and/or signals.

The inspection computer 3, associated with a display screen, may be located for example in a maintenance station or an assembly station on the ground and it operates by running at least one software for the purpose in particular of managing inspection signals and reference data intended for inspection purposes.

The inspection computer 3 is connected to the avionics system 1 or to at least one of its components via an Ethernet network 4, in particular so as to exchange inspection signals and reference data.

The inspection system in accordance with the invention thus serves to display on the screen information or signals reaching the input terminals of the avionics system 1 via analog lines 5, digital lines 6, video lines 7, Ethernet lines 8, and/or discrete lines 9.

The information or signals as displayed in this way may for example be electric voltages, valid or invalid operating states, open or closed states, active or inactive states, or other signals or states.

The inspection system in accordance with the invention also serves to inject inspection signals, e.g. in the form of electric voltages, to output terminals of the components of the avionics system 1. Such injection of inspection signals then takes place over the analog lines 5, the digital lines 6, the Ethernet lines 8, or the discrete lines 9.

By way of example, the signals may also be injected over the video lines 7. This can be done merely by defining the Ethernet resource so that it can process signals of that type.

FIG. 2 is another diagram of an embodiment of the inspection system in accordance with the invention.

The inspection computer 3 runs an operating system or calculation means 10 that include the software enabling them to carry out the inspection method in accordance with the invention.

By way of example, the avionics system 1 includes components 11, 12, and 13 each respectively presenting at least one structural or functional portion 11a, 12a, 13a belonging thereto, and at least one control portion 11b, 12b, 13b embodied by a controller or a particular calculation function of the avionics system 1.

The method of inspecting the integrity of at least one component of the avionics system installed in an aircraft consists in inspecting the integrity of said component in terms of electrical installation and data acquisition and data transmission.

In a step a), the inspection method consists in using an Ethernet network connecting the avionics system to an inspection computer in order to exchange inspection signals.

In a step b), the inspection method consists in using the inspection computer to generate first inspection signals that are transmitted to the component and/or in acquiring second inspection signals coming from the component.

In a step c), the inspection method consists in using data read and write means of a controller of the avionics system to generate reference data relating to the component and transmitted to the inspection computer via the Ethernet network.

In a step d), the inspection method consists in using a screen connected to the inspection computer to display the reference data and the inspection signals for the purpose of monitoring and/or comparison by an operator.

In a step e), the inspection method consists in recording as appropriate the reference data and the inspection signals in a memory of the inspection computer.

In an implementation, the reference data and the inspection signals which have to be recorded are previously selected. The selection occurs with respect of a predeterminated classification of each data or signal. It can happen that all, only a part or none of the reference data and/or signals are recorded.

By way of example, the inspection method in accordance with the invention serves to inspect all of the components of the avionics system.

In an implementation, the inspection method in accordance with the invention also consists, on starting, in displaying the results of automatic test functions that are incorporated in the controller of the avionics system and that relates to each component of the avionics system.

In an implementation, the inspection method in accordance with the invention also consists in selecting stimulation values as first inspection signals, and in injecting them in real time to the outlet terminals of the outlet interface of each component.

In an implementation, the inspection method in accordance with the invention also consists in injecting the stimulation values individually one after another.

In an implementation, the inspection method in accordance with the invention also consists in acting in real time to acquire second inspection signals constituted either by the operating states of all of the input terminals of the input interface of each component, or else the physical values measured at said input terminals.

In an implementation, the inspection method in accordance with the invention also consists in acquiring inspection signals relating to the input terminals at a frequency of about 2 hertz (Hz).

In an implementation, the inspection method in accordance with the invention also consists in controlling functions of an aircraft under the control of the avionics system, such as fuel management, engine management, buoyancy, or managing fire-fighting.

In an implementation, the inspection method in accordance with the invention also consists in incorporating inspection instructions in the operating software of each piece of equipment managed by the avionics system, said instructions serving to generate and to acquire signals that are functionally compatible with the inspection computer.

In an implementation, the inspection method in accordance with the invention also consists in inhibiting the inspection instructions when the aircraft is in its operational functioning state, and in activating said inspection instructions when the aircraft is in the maintenance state.

Naturally, the present invention can be subjected to numerous variants concerning its implementation. Although several embodiments and implementations are described, it will readily be understood that it is not conceivable to identify exhaustively all possible embodiments or implementations. It is naturally possible to envisage replacing any of the means described or any of the steps described by equivalent means or an equivalent step without going beyond the ambit of the present invention.

What is claimed is:

1. A method of inspecting the integrity of at least one component of an avionics system installed in an aircraft, said method comprising monitoring the integrity of said component in terms of electrical installation and data acquisition and data transmission, wherein the method comprises:
    a) using an Ethernet network connecting the avionics system to an inspection computer to exchange inspection signals;
    b) using the inspection computer to generate first inspection signals that are transmitted to the component and/or to acquire second inspection signals that come from the component;
    c) using data read and write means of a controller of the avionics system to generate reference data relating to the component and transmitted to the inspection computer via the Ethernet network;
    d) using a screen connected to the inspection computer to display the reference data and the inspection signals for the purposes of monitoring and/or comparison by an operator; and
    e) selecting the reference data and the inspection signals, and recording the selected reference data and the inspection signals in a memory of the inspection computer;
    wherein, on starting, displaying the results of automatic test functions that are incorporated in a controller of the avionics system and that relate to each component of the avionics system.

2. A method according to claim 1, comprising inspecting all of the components of the avionics systems.

3. A method according to claim 1, comprising selecting stimulation values as first inspection signals, and injecting said stimulation values in real time to the outlet terminals of the outlet interface of each component.

4. A method according to claim 3, comprising injecting the stimulation values individually one after another.

5. A method according to claim 1, comprising acting in real time to acquire second inspection signals constituted either by operating states of all of the input terminals of an input interface of each component, or else the physical values measured at said input terminals.

6. A method according to claim 5, comprising acquiring inspection signals relating to the input terminals at a frequency of about 2 Hz.

7. A method according to claim 1, comprising controlling functions of an aircraft under the control of the avionics system.

8. A method according to claim 7 wherein said controlling functions comprising at least a function chosen in the following list: fuel management, engine management, buoyancy, or managing fire-fighting.

9. A method according to claim 1, comprising incorporating inspection instructions in the operating software of each piece of equipment managed by the avionics system, said instructions serving to generate and to acquire signals that are functionally compatible with the inspection computer.

10. A method according to claim 9, comprising inhibiting the inspection instructions when the aircraft is in its operational functioning state, and activating said inspection instructions when the aircraft is in the maintenance state.

11. An inspection system for implementing the inspection method in accordance with claim 1, wherein the system comprises:
    an inspection computer associated with a display screen or a user graphics interface;
    at least one software for generating inspection signals and reference signals for inspection purposes;
    an Ethernet network connecting the inspection computer to the avionics system or to at least one component of the avionics system, so as to exchange inspection signals and reference data;
    on-board inspection device including commonplace device for reading and writing signals and data of each component; and
    on-board transmission device for conveying signals or data via the Ethernet network between at least one component of the avionics system and the inspection computer.

12. A system according to clam 11, comprising a device for selecting and recording the data, or the signals, or the data and the signals.

13. A system according to claim 12, wherein the commonplace device for reading and writing are incorporated in each component of the avionics system and can process analog acquisition runs from the components of said avionics system and can transform said acquisitions into digital values, which values are made available in real time on a port of the Ethernet network.

14. A system according to claim 12, wherein the inspection device and the transmission device are on board the aircraft.

15. A method of inspecting the integrity of at least one component of an avionics system installed in an aircraft, said method comprising monitoring the integrity of said component in terms of electrical installation and data acquisition and data transmission, wherein the method comprises:
    a) using an Ethernet network connecting the avionics system to an inspection computer to exchange inspection signals;
    b) using the inspection computer to generate first inspection signals that are transmitted to the component and/or to acquire second inspection signals that come from the component;
    c) using data read and write means of a controller of the avionics system to generate reference data relating to the component and transmitted to the inspection computer via the Ethernet network;
    d) using a screen connected to the inspection computer to display the reference data and the inspection signals for the purposes of monitoring and/or comparison by an operator; and
    e) selecting the reference data and the inspection signals, and recording the selected reference data and the inspection signals in a memory of the inspection computer;
    inspection instructions being incorporated in the operating software of each piece of equipment managed by the avionics system, and said instructions serving to generate and to acquire signals that are functionally compatible with the inspection computer.

16. An inspection system for implementing a method of inspecting the integrity of at least one component of an avionics system installed in an aircraft, the method comprising monitoring the integrity of said component in terms of electrical installation and data acquisition and data transmission, wherein the method comprises:
    a) using an Ethernet network connecting the avionics system to an inspection computer to exchange inspection signals;
    b) using the inspection computer to generate first inspection signals that are transmitted to the component and/or to acquire second inspection signals that come from the component;

c) using data read and write means of a controller of the avionics system to generate reference data relating to the component and transmitted to the inspection computer via the Ethernet network;
d) using a screen connected to the inspection computer to display the reference data and the inspection signals for the purposes of monitoring and/or comparison by an operator; and
e) selecting the reference data and the inspection signals, and recording the selected reference data and the inspection signals in a memory of the inspection computer;
wherein, on starting, displaying the results of automatic test functions that are incorporated in a controller of the avionics system and that relate to each component of the avionics system;
said system comprising:
an inspection computer associated with a display screen or a user graphics interface;
at least one software for generating inspection signals and reference signals for inspection purposes;
an Ethernet network connecting the inspection computer to the avionics system or to at least one component of the avionics system, so as to exchange inspection signals and reference data;
on-board inspection device including commonplace device for reading and writing signals and data of each component; and
on-board transmission device for conveying signals or data via the Ethernet network between at least one component of the avionics system and the inspection computer.

* * * * *